(12) United States Patent
Morishima et al.

(10) Patent No.: US 9,899,681 B2
(45) Date of Patent: Feb. 20, 2018

(54) POSITIVE ELECTRODE FOR SECONDARY BATTERIES, SECONDARY BATTERY, AND METHOD FOR PRODUCING POSITIVE ELECTRODE FOR SECONDARY BATTERIES

(71) Applicant: TOYO ALUMINIUM KABUSHIKI KAISHA, Osaka-shi, Osaka (JP)

(72) Inventors: Yui Morishima, Osaka (JP); Hidetoshi Inoue, Osaka (JP); Kunihiko Nakayama, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 0 days.

(21) Appl. No.: 14/409,857

(22) PCT Filed: Jun. 26, 2013

(86) PCT No.: PCT/JP2013/067443
§ 371 (c)(1),
(2) Date: Dec. 19, 2014

(87) PCT Pub. No.: WO2014/003034
PCT Pub. Date: Jan. 3, 2014

(65) Prior Publication Data
US 2015/0364765 A1    Dec. 17, 2015

(30) Foreign Application Priority Data

Jun. 27, 2012   (JP) .................................. 2012-143751

(51) Int. Cl.
*H01M 4/04*    (2006.01)
*H01M 4/1391*  (2010.01)
(Continued)

(52) U.S. Cl.
CPC ......... *H01M 4/621* (2013.01); *H01M 4/0404* (2013.01); *H01M 4/0471* (2013.01);
(Continued)

(58) Field of Classification Search
CPC .. H01M 4/1397; H01M 4/136; H01M 4/5825; H01M 4/663; H01M 4/661;
(Continued)

(56) References Cited

U.S. PATENT DOCUMENTS

2004/0234858 A1   11/2004   Torimae et al.
2006/0171102 A1    8/2006   Ro et al.
(Continued)

FOREIGN PATENT DOCUMENTS

CN    101179126 A    5/2008
CN    101260282 A    9/2008
(Continued)

OTHER PUBLICATIONS

English translation of JP Publication 2008-098590, Apr. 2008.*
(Continued)

*Primary Examiner* — Brittany Raymond
(74) *Attorney, Agent, or Firm* — Westerman, Hattori, Daniels & Adrian, LLP

(57) ABSTRACT

Provided is a secondary battery positive electrode that can improve the rapid charge and discharge and can increase the heat resistance. Also provided are a secondary battery comprising the secondary battery positive electrode, and a method for producing the secondary battery positive electrode. The secondary battery positive electrode comprises an aluminum material, a positive active material layer comprising a lithium-containing metal oxide as a positive active material, and formed on the surface of the aluminum material, and an intervening layer comprising aluminum and carbon, and formed between the aluminum material and the positive active material layer. A secondary battery positive electrode is produced by forming a positive electrode active material layer comprising a lithium-containing metal oxide as a positive electrode active material on the surface of an (Continued)

aluminum material, and heating the aluminum material with the positive active material layer formed thereon in a space containing a hydrocarbon-containing substance.

7 Claims, 6 Drawing Sheets

(51) Int. Cl.

| | | |
|---|---|---|
| *H01M 4/58* | (2010.01) | |
| *H01M 4/62* | (2006.01) | |
| *H01M 4/66* | (2006.01) | |
| *H01M 10/0525* | (2010.01) | |
| *H01M 4/136* | (2010.01) | |
| *H01M 4/1397* | (2010.01) | |
| *H01M 10/052* | (2010.01) | |
| *H01M 10/0565* | (2010.01) | |
| *H01M 4/02* | (2006.01) | |

(52) U.S. Cl.
CPC ......... *H01M 4/136* (2013.01); *H01M 4/1391* (2013.01); *H01M 4/1397* (2013.01); *H01M 4/5825* (2013.01); *H01M 4/661* (2013.01); *H01M 4/663* (2013.01); *H01M 10/052* (2013.01); *H01M 10/0525* (2013.01); *H01M 4/0409* (2013.01); *H01M 10/0565* (2013.01); *H01M 2004/028* (2013.01); *H01M 2220/30* (2013.01)

(58) Field of Classification Search
CPC .. H01M 4/621; H01M 4/1391; H01M 4/0409; H01M 4/0404; H01M 4/0471; H01M 10/0525; H01M 10/052; H01M 10/0565; H01M 2004/028; H01M 2220/30; Y02E 60/122; Y02P 70/54
See application file for complete search history.

(56) References Cited

U.S. PATENT DOCUMENTS

| | | |
|---|---|---|
| 2006/0172134 A1 | 8/2006 | Ro et al. |
| 2008/0131779 A1 | 6/2008 | Kami et al. |
| 2011/0123861 A1 | 5/2011 | Wu et al. |
| 2012/0003544 A1 | 1/2012 | Nakayama et al. |
| 2012/0321957 A1 | 12/2012 | Schaefer et al. |
| 2013/0330617 A1 | 12/2013 | Yoshimura et al. |

FOREIGN PATENT DOCUMENTS

| | | | |
|---|---|---|---|
| CN | 101752545 A | | 6/2010 |
| DE | 102009051214 A1 | | 5/2011 |
| JP | 2000-507996 A | | 6/2000 |
| JP | 2003-68282 A | | 3/2003 |
| JP | 2004-335344 A | | 11/2004 |
| JP | 2008-098590 | * | 4/2008 |
| JP | 2008-98590 A | | 4/2008 |
| JP | 2008-160053 A | | 7/2008 |
| JP | 2010-186626 A | | 8/2010 |
| TW | 200423459 A | | 11/2004 |
| TW | 201222949 A1 | | 6/2012 |
| WO | 97/27260 A1 | | 7/1997 |
| WO | 2004/086539 A1 | | 10/2004 |
| WO | 2010/109783 A1 | | 9/2010 |
| WO | WO 2010-109783 | * | 9/2010 |
| WO | 2012/115050 A1 | | 8/2012 |

OTHER PUBLICATIONS

English translation of WO 2010-109783, Sep. 2010.*
International Search Report dated Oct. 1, 2013, issued in corresponding application No. PCT/JP2013/067443.
Extended (Supplementary) European Search Report (EESR) dated Jan. 26, 2016, issued in counterpart European Patent Application No. 13810339.5. (8 pages).
Offic Action dated Jan. 5, 2017, issued in counterpart Chinese Application No. 201380034342.9, with English translation (13 pages).

* cited by examiner

POSITIVE ELECTRODE FOR SECONDARY BATTERIES, SECONDARY BATTERY, AND METHOD FOR PRODUCING POSITIVE ELECTRODE FOR SECONDARY BATTERIES

TECHNICAL FIELD

The present invention generally relates to a secondary battery positive electrode used as a positive electrode constituting a secondary battery, a secondary battery comprising the same, and a method for producing the secondary battery positive electrode. The present invention specifically relates to a secondary battery positive electrode used as a positive electrode of a lithium ion battery, lithium ion polymer battery, etc., a secondary battery comprising the same, and a method for producing the secondary battery positive electrode.

BACKGROUND ART

Batteries are used as a means for directly converting chemical energy to electrical energy. Batteries discharge electric charge, or repeatedly charge and discharge electric charge using electrochemical changes, and are therefore used as power sources of various electrical and electronic devices.

Recently, as secondary batteries with high energy efficiency, lithium ion batteries, lithium ion polymer batteries, etc., are used as power sources of mobile phones, personal computers, cameras, etc.

A positive electrode for lithium ion batteries is produced by applying a positive electrode active material slurry prepared by mixing a positive electrode active material (e.g., $Li_{1+x}Mn_{2-x-y}M_yO_4$), carbon particles, a binder, and a solvent (e.g., N-methyl-2-pyrrolidone (NMP)) to an aluminum foil, which is used as a collector, then drying the slurry, and performing pressing to a predetermined thickness, as described, for example, in JP2003-68282A (hereinafter, PTL 1). Moreover, polyvinylidene fluoride (PVDF) having excellent chemical resistance, etc., is widely used as a binder, as described, for example, in PTL 1 and JP2000-507996A (PTL 2).

CITATION LIST

Patent Literature

PTL 1: JP2003-68282A
PTL 2: JP2000-507996A

SUMMARY OF INVENTION

Technical Problem

However, PVDF used as a binder has low heat resistance, and may be degraded at a temperature of about 75° C. Even when PVDF with high heat resistance is used, PVDF is swollen by absorbing the electrolyte at a temperature exceeding 60° C., sometimes leading to peeling of the positive electrode active material. Further, when a lithium ion battery comprising a positive electrode obtained by binding a positive electrode active material to the surface of aluminum foil using PVDF is rapidly charged and discharged, the temperature of the inside of the battery increases due to heat generated by the electrical resistance of the battery during rapid charging and discharging. This causes a problem in that the capacity of the battery during rapid charging and discharging is lower than that during slow charging and discharging. That is, a lithium ion battery comprising a positive electrode in which a positive electrode active material is bound to the surface of aluminum foil using PVDF as a binder has the problem of inferior rapid charge and discharge characteristics.

Recently, the use of secondary batteries in higher-temperature environments is required. However, when a lithium ion battery comprising the above positive electrode is rapidly charged and discharged in a high-temperature environment, there is a problem in that the capacity of the battery is lower than that in a low-temperature environment. The reason for this is as follows. Theoretically, since the conductivity of Li ions increases at a higher temperature, the capacity of the battery is supposed to increase when the battery is charged and discharged in a high-temperature environment. In practice, however, when charge and discharge are repeated in a high-temperature environment, PVDF is swollen by absorbing the electrolyte, leading to peeling of the positive electrode active material, as described above. As a result, the positive electrode is deteriorated, and the capacity is significantly reduced. Consequently, the capacity of the battery becomes lower than when the battery is repeatedly charged and discharged in a low-temperature environment. That is, since a positive electrode in which a positive electrode active material is bound using PVDF as a binder is deteriorated by heat, the lithium ion battery comprising the positive electrode has the problem of inferior heat resistance.

Accordingly, an object of the present invention is to provide a secondary battery positive electrode that can improve the rapid charge and discharge characteristics of a secondary battery and increase the heat resistance of the secondary battery; a secondary battery comprising the same; and a method for producing the secondary battery positive electrode.

Solution to Problem

The secondary battery positive electrode according to the present invention comprises an aluminum material; a positive active material layer comprising a lithium-containing metal oxide as a positive active material, and formed on the surface of the aluminum material; and an intervening layer comprising aluminum and carbon, and formed between the aluminum material and the positive active material layer.

In the secondary battery positive electrode of the present invention, the lithium-containing metal oxide as a positive electrode active material is preferably $LiFePO_4$.

Moreover, in the secondary battery positive electrode of the present invention, the intervening layer preferably includes a surface portion formed at least in a partial region of the surface of the aluminum material and comprising aluminum carbide.

The secondary battery according to the present invention comprises a secondary battery positive electrode having the above features.

The secondary battery of the present invention is preferably a lithium ion battery or a lithium ion polymer battery.

The method for producing a secondary battery positive electrode according to the present invention comprises the steps of:

forming a positive active material layer comprising a lithium-containing metal oxide as a positive active material on the surface of an aluminum material; and heating the aluminum material with the positive active material layer formed thereon in a space containing a hydrocarbon-containing substance.

In the method for producing a secondary battery positive electrode according to the present invention, the heating step is preferably performed at a temperature of 450° C. or more and less than 660° C.

Advantageous Effects of Invention

According to the present invention, a positive electrode active material layer is bound to the surface of an aluminum material by means of an intervening layer, and the intervening layer is not deteriorated by heat generated during rapid charging and discharging of a secondary battery; thus, the rapid charge and discharge characteristics of the secondary battery can be improved, and the heat resistance of the secondary battery can be increased because the intervening layer is not deteriorated even when the secondary battery is used in a high-temperature environment. Moreover, since the obtained secondary battery has low resistance, the rapid charge and discharge characteristics of the secondary battery can be improved.

DESCRIPTION OF EMBODIMENTS

Figure 1:
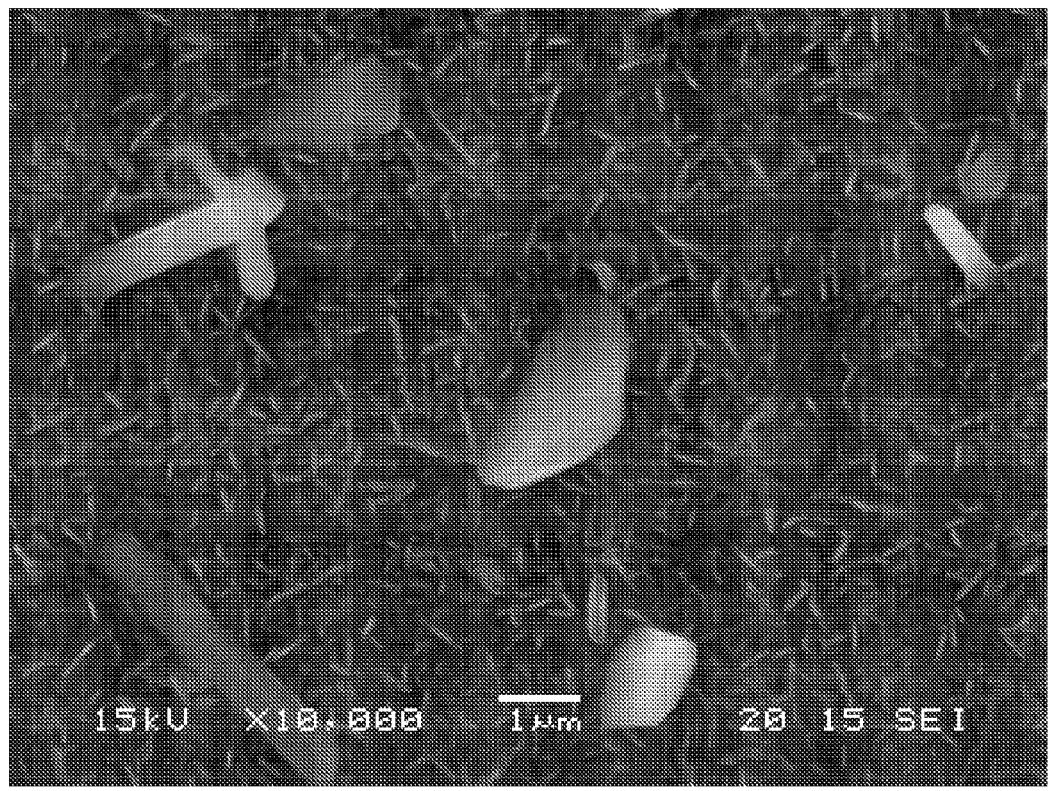
FIG. 1 shows an electron micrograph of the intervening layer in the secondary battery positive electrode produced in Example 1 of the present invention. The aluminum portion was dissolved in a bromine-methanol mixture, and the surface of the remaining intervening layer was directly observed by a scanning electron microscope (SEM).

Embodiments of the present invention are described below.

Secondary Battery Positive Electrode

According to one embodiment of the present invention, in the cross-sectional structure of a secondary battery positive electrode, a positive electrode active material layer comprising a lithium-containing metal oxide as a positive electrode active material is formed on the surface of an aluminum material. An intervening layer comprising aluminum and carbon is formed between the aluminum material and the positive electrode active material layer.

In the secondary battery positive electrode of the present invention, the intervening layer comprising aluminum and carbon formed between the aluminum material and the positive electrode active material layer has the action of increasing the adhesion between the surface of the aluminum material and the positive electrode active material layer formed on the surface of the aluminum material. As a result of this action, when the secondary battery positive electrode of the present invention is used in a secondary battery, such as a lithium ion battery, the intervening layer is not deteriorated, by heat generated during rapid charging and discharging of the secondary battery, or when the secondary battery is used in a high-temperature environment; thus, the rapid charge and discharge characteristics of the secondary battery can be improved, and the heat resistance of the secondary battery can be increased.

Furthermore, the secondary battery has lower electric resistance, and the rapid charge and discharge characteristics of the secondary battery can be improved.

Aluminum Material

According to one embodiment of the present invention, the aluminum material used as the substrate of the secondary battery positive electrode is not particularly limited. The aluminum material may be pure aluminum or an aluminum alloy. Such an aluminum material preferably has an aluminum purity of 98 mass % or more, as measured by the method described in "JIS H2111." The aluminum material used in the present invention comprises an aluminum alloy having a composition containing a required amount of at least one alloy element selected from lead (Pb), silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B); or comprises aluminum with a limited content of an inevitable impurity element mentioned above. Although the thickness of the aluminum material is not particularly limited, the thickness of a foil is preferably 5 μm or more and 200 μm or less, and the thickness of a plate is preferably more than 200 μm and 3 mm or less.

The aluminum material may be produced by a known method. For example, molten metal of aluminum or an aluminum alloy having the above specific composition is prepared, the molten metal is cast to obtain an ingot, and the ingot is appropriately homogenized. Then, the ingot is subjected to hot rolling and cold rolling, thereby obtaining an aluminum material. Further, intermediate annealing may be performed at a temperature of 150° C. or more and 400° C. or less in the course of cold rolling.

Positive Electrode Active Material Layer

In the secondary battery positive electrode of the present invention, a positive electrode active material layer comprising a lithium-containing metal oxide as a positive electrode active material is formed on the surface of the aluminum material.

The lithium-containing metal oxide is not particularly limited, as long as it is generally used as a positive electrode active material constituting the positive electrode of a lithium ion battery. The lithium-containing metal oxide is preferably one that is hardly decomposed by heat, less likely to undergo characteristic changes by heat, stable against heat, and heat-resistant, in a heating step described later.

The lithium-containing metal oxide is represented by, for example, the general formula $LixMO_2$, $LixM_2O_4$, $LixMAO_4$, or the like. Here, M is one or more transition metal elements, such as Co, Ni, Mn, Fe, etc. A is P, Si, S, V, or the like. The lithium-containing metal oxide used in the present invention may be one whose composition or crystal structure does not change in the heating step. Specific examples thereof include $LiMPO_4$, $LiM_2O_4$, and the like; further, $LiFePO_4$ is more preferred. Here, M is one or more transition metal elements, such as Co, Ni, Mn, Fe, etc.

Moreover, the form of the lithium-containing metal oxide is not particularly limited. It is preferable, in terms of adhesion, conductivity, and high capacity, that the lithium-containing metal oxide is contained in the positive electrode active material layer in a state in which the surface of the metal oxide is not coated with carbon. The lithium-containing metal oxide may be contained in the positive electrode active material layer in a state in which the surface of the metal oxide is coated with carbon. Further, the particle size of the lithium-containing metal oxide is not particularly limited, but is 0.001 μm or more and 100 μm or less, and preferably 0.001 μm or more and 50 μm or less, in terms of improving electrical characteristics.

The positive electrode active material layer may be formed on at least one side or both sides of the aluminum material. The thickness of the positive electrode active material layer on one side is not particularly limited, but is preferably 1 μm or more and 500 μm or less, more preferably 10 μm or more and 200 μm or less, and even more preferably 10 μm or more and 100 μm or less, because the adhesion between the lithium-containing metal oxide and the aluminum material can be ensured. Furthermore, the positive electrode active material layer may be formed on the entire surface of the aluminum material, or the aluminum material may have a portion in which the positive electrode active material layer is not formed, depending on the application to be finally applied (for example, when the aluminum material is designed to have a part in which the positive electrode active material layer is not formed, so as to connect a terminal to the edge of the aluminum material).

In a later-described step of forming a positive electrode active material layer, when a positive electrode active material-containing slurry contains a binder, the positive electrode active material layer constituting the secondary battery positive electrode of the present invention contains carbide that is assumed to be converted from the binder by heat in the later-described heating step. In this case, the carbide serves as a conductive material to thereby increase the conductivity of the positive electrode active material layer.

Further, the positive electrode active material layer may suitably contain other components, such as carbon-containing particles acting as other active materials, a surfactant, a viscosity-adjusting agent, metal powder, etc., as required. The type of carbon-containing particles is not particularly limited. Examples of carbon-containing particles include activated carbon fibers, activated carbon cloth, activated carbon felt, activated carbon powder, India ink, carbon black, and graphite. Another preferable example of carbon-containing particles is a carbon compound, such as silicon carbide.

Intervening Layer

In the secondary battery positive electrode of the present invention, an intervening layer comprising aluminum and carbon is formed between the aluminum material and the positive electrode active material layer.

The intervening layer is preferably formed at least in a partial region of the surface of the aluminum material, and comprises aluminum carbide such as $Al_4C_3$. Due to the presence of the intervening layer, the positive electrode active material layer is firmly attached to the aluminum material.

In addition, a plurality of intervening layers may be formed on the surface of the aluminum material in the shape of islands apart from each other or adjacent to each other. The size of the intervening layer is not particularly limited.

Secondary Battery

The secondary battery positive electrode of the present invention having the above features is used to constitute a secondary battery. Examples of the secondary battery using the secondary battery positive electrode of the present invention include lithium ion batteries, lithium ion polymer batteries, and the like. The secondary battery comprising the secondary battery positive electrode of the present invention maintains stable rapid charge and discharge characteristics, and has a longer life.

Method for Producing Secondary Battery Positive Electrode

The method for producing a secondary battery positive electrode according to the present invention comprises the step of forming a positive electrode active material layer, wherein a positive electrode active material layer comprising a lithium-containing metal oxide as a positive electrode active material is formed on the surface of an aluminum material. Following the step of forming a positive electrode active material layer, a heating step is performed to heat the aluminum material with the positive electrode active material layer formed thereon in a space containing a hydrocarbon-containing substance, thereby obtaining a secondary battery positive electrode in which the positive electrode active material layer is formed on the surface of the aluminum material via an intervening layer comprising aluminum and carbon.

Step of Forming Positive Electrode Active Material Layer

In one embodiment of the method for producing a secondary battery positive electrode according to the present invention, first, a lithium-containing metal oxide is attached to the surface of an aluminum material to form a positive electrode active material layer comprising the lithium-containing metal oxide as a positive electrode active material on the surface of the aluminum material.

In the step of forming a positive electrode active material layer, the method for attaching the lithium-containing metal oxide as a positive electrode active material to the surface of the aluminum material is not particularly limited. For example, lithium-containing metal oxide particles or a mixture of lithium-containing metal oxide particles and a binder is dispersed in a solvent to form a slurry, and the slurry is applied to the surface of the aluminum material. The coating method in this case is not particularly limited. Examples of the coating method include spin coating, bar coating, flow coating, dip coating, etc. Other examples of the attaching method include an extrusion method, etc.

When the slurry is applied to the surface of the aluminum material, as described above, the type of solvent to be used is not particularly limited. Examples of the solvent include aromatic solvents, such as toluene; ketones, such as methyl ethyl ketone; alcohols, such as isopropyl alcohol; water; and the like. For example, a mixed solvent of toluene, methyl ethyl ketone, and isopropyl alcohol at a volume ratio of 6:3:1 can be used. The amount of the solvent in the slurry is also not particularly limited. For example, the amount of the solvent is set in the range of 1 g to 200 g based on 30 g of lithium-containing metal oxide particles to be dispersed in the solvent.

Further, when the slurry contains a binder, the type of binder to be used is not particularly limited. Examples of the binder include polyvinyl alcohol-based resins, polyvinyl butyral-based resins, epoxy-based resins, aromatic resins having a ring structure (e.g., phenol-based resins), acrylic resins, and the like. Polyvinyl butyral-based resins are particularly preferred. The amount of the binder in the slurry is also not particularly limited. For example, the amount of the binder is set in the range of 0.1 g to 100 g based on 30 g of lithium-containing metal oxide particles to be dispersed in the solvent.

The step of forming a positive electrode active material layer may include a step of drying the positive electrode active material layer formed on the surface of the aluminum material. The drying step may be performed by heating. The heating temperature in the drying step is not particularly limited, but is, for example, preferably 10° C. or more and 150° C. or less, and more preferably 50° C. or more and 150° C. or less. In this case, it is preferable to uniformly dry the positive electrode active material layer. Moreover, the drying time is preferably 30 seconds or more and 5 hours or less, although it varies depending on the types of the solvent and binder used to attach the positive electrode active material.

When the heating temperature in the drying step is below 10° C., the binder is not bound, and the positive electrode active material layer may be peeled from the surface of the aluminum material. Moreover, when the positive electrode active material is attached by applying a slurry, the solvent may not be sufficiently volatilized, and may remain. The solvent may be rapidly volatilized upon heating in the subsequent heating step, thereby causing generation of bubbles (bubbling) in the positive electrode active material layer. In contrast, when the heating temperature in the drying step exceeds 400° C., cracks may be formed by rapid heating on the surface of the positive electrode active material layer.

The positive electrode active material layer may be formed on at least one side of the aluminum material. Moreover, the density of the positive electrode active material layer is not particularly limited. However, when the density of the positive electrode active material layer exceeds a predetermined range, the electrical characteristics of the positive electrode active material layer may be deteriorated. It is therefore preferable to adjust the density of the positive electrode active material layer within a predetermined range by suitably performing a pressing step. The pressing step may be performed at any time after the positive electrode active material layer is formed on the surface of the aluminum material; however, it is preferable to perform the pressing step before the later-described heating step, in terms of further improving the adhesion between the aluminum material and the positive electrode active material layer. The specific density range cannot be generally specified because it varies depending on the type of lithium-containing metal oxide, the type of binder, and the proportion of lithium-containing metal oxide and binder. When $LiFePO_4$ is used as the lithium-containing metal oxide, it is preferable that the density of the positive electrode active material layer is 1 $g/cm^3$ to 3 $g/cm^3$.

Further, after the drying step, an oxidation heating step may be performed to heat the aluminum material with the positive electrode active material layer formed thereon in an oxidizing atmosphere, such as air. Since the excessive binder is subjected to oxidative degradation by the oxidation heating step, spaces are formed in the positive electrode active material layer, following the oxidative degradation of the binder. This consequently facilitates the formation of an intervening layer comprising aluminum and carbon, which is to be formed in the later-described heating step, in the interface between the positive electrode active material layer and the aluminum material, thereby increasing adhesion.

Heating Step

After the step of forming a positive electrode active material layer, the aluminum material with the positive electrode active material layer formed thereon is heated in a space containing a hydrocarbon-containing substance, thereby forming an intervening layer comprising aluminum and carbon between the aluminum material and the positive electrode active material layer.

In one embodiment of the method for producing a secondary battery positive electrode according to the present invention, the type of the hydrocarbon-containing substance used in the heating step is not particularly limited. Examples of the type of hydrocarbon-containing substance include paraffin hydrocarbons, such as methane, ethane, propane, n-butane, isobutane, and pentane; olefin hydrocarbons, such as ethylene, propylene, butene, and butadiene; acetylene hydrocarbons, such as acetylene; or derivatives of these hydrocarbons. Among these hydrocarbons, paraffin hydrocarbons, such as methane, ethane, and propane, are preferred because they become gas in the heating step. An even more preferred hydrocarbon is one of methane, ethane, and propane. The most preferable hydrocarbon is methane.

The hydrocarbon-containing substance may be used in the form of liquid, gas, or the like, in the production method of the present invention. The hydrocarbon-containing substance is placed in a space in which the aluminum material is present, and may be introduced into the space, in which the aluminum material is placed, by any method. For example, when the hydrocarbon-containing substance is gas (methane, ethane, propane, etc.), the hydrocarbon-containing substance may be introduced alone or together with inert gas into a closed space where the heating step is to be performed. Alternatively, when the hydrocarbon-containing substance is liquid, the hydrocarbon-containing substance may be introduced alone or together with inert gas into the closed space so that the substance is vaporized in the space.

In the heating step, the pressure of the heating atmosphere is not particularly limited, and may be ordinary pressure, reduced pressure, or increased pressure. Further, the pressure may be adjusted at any time while maintaining the temperature at a specific heating temperature, increasing the temperature to the specific heating temperature, or decreasing the temperature from the specific heating temperature.

The mass ratio of the hydrocarbon-containing substance to be introduced into the space where the heating step is to be performed is not particularly limited; however, it is generally preferably 0.1 parts by mass or more and 50 parts by mass or less, and particularly preferably 0.5 parts by mass or more and 30 parts by mass or less, calculated as carbon, based on 100 parts by mass of aluminum.

In the heating step, the heating temperature may be suitably set depending on the composition, etc., of the aluminum material to be heated, but is generally preferably 450° C. or more and less than 660° C., and more preferably 530° C. or more and 640° C. or less. However, the production method of the present invention does not exclude heating the aluminum material at a temperature of less than 450° C. The aluminum material may be heated at a temperature of at least more than 300° C.

The heating time is generally 1 hour or more and 100 hours or less, although it depends on the heating temperature, etc. When the heating temperature is 400° C. or more, it is preferable that the oxygen concentration in the heating atmosphere is 1.0 volume % or less. When the oxygen concentration in the heating atmosphere at a heating temperature of 400° C. or more exceeds 1.0 volume %, the thermally oxidized film on the surface of the aluminum material may be expanded, and the surface resistance value of the aluminum material may increase.

Further, the surface of the aluminum material may be roughened before the heating step. The surface roughening method is not particularly limited, and any known technique, such as washing, etching, or blasting, can be used.

As described above, according to the production method of the present invention, a positive electrode active material layer can be attached to the surface of an aluminum material by a simple method in which a positive electrode active material comprising a lithium-containing metal oxide as a positive electrode active material is attached to the surface of the aluminum material to form the positive electrode active material layer, and the aluminum material is heated in a space containing a hydrocarbon-containing substance. The intervening layer, which contributes to the binding of the positive electrode active material layer to the surface of the aluminum material, is not deteriorated, even by heat generated during rapid charging and discharging of the secondary battery, or even when the secondary battery is used in a high-temperature environment; thus, the heat resistance of the secondary battery can be increased.

Furthermore, the secondary battery has lower electric resistance, and the rapid charge and discharge characteristics of the secondary battery can be improved.

EXAMPLES

Secondary battery positive electrodes using aluminum materials (aluminum foil) as substrates were produced according to the following Examples and Comparative Examples.

Example 1

Step of Forming Positive Electrode Active Material Layer

Lithium iron phosphate ($LiFePO_4$) particles (pyrolysis temperature in air: 400° C. or more) as a lithium-containing metal oxide, i.e., a positive electrode active material, and a polyvinyl butyral-based resin as a binder were mixed at a mass ratio of 80:20. A mixed solvent of toluene, methyl ethyl ketone, and isopropyl alcohol (volume ratio=6:3:1) as a solvent was suitably added thereto to prepare a slurry.

The slurry was applied to the surface of aluminum foil having a purity of 99.85% by a doctor blade method with a coating amount of 6.2 $mg/cm^2$ (on a dry mass basis), and dried in a drying oven at a temperature of 120° C. for 3 minutes, thereby forming a positive electrode active material layer on one surface of the aluminum foil.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 630° C. for 20 hours, thereby forming an intervening layer between the aluminum foil and the positive electrode active material layer. Thereafter, the aluminum foil with the positive electrode active material layer formed on its surface was punched into a disc having a diameter of 15.5 mm, and pressed so that the density of the positive electrode active material layer (calculated from the coating amount and thickness) was 1.7 $g/cm^3$.

Thus, the secondary battery positive electrode of the present invention was produced.

In order to observe the intervening layer of the secondary battery positive electrode obtained in Example 1, the aluminum portion was dissolved in a bromine-methanol mixture, and the surface of the remaining intervening layer was directly observed by a scanning electron microscope (SEM). FIG. 1 shows the obtained micrograph. Specifically, the micrograph of FIG. 1 shows the surface of the intervening layer exposed after the removal of the aluminum material, observed from the back side of the positive electrode (intervening layer) toward the positive electrode active material layer. The magnification of the micrograph in FIG. 1 is 10,000-fold.

FIG. 1 clearly shows that many intervening layers are formed in the shape of separate islands at least in a partial region of the surface of the aluminum material in the secondary battery positive electrode of Example 1.

The thickness of the positive electrode active material layer in the secondary battery positive electrode of the present invention obtained in Example 1 was 40 μm, which was determined by measuring the thickness of the secondary battery positive electrode using a micrometer, and subtracting the thickness of the aluminum foil therefrom.

Comparative Example 1

Lithium iron phosphate ($LiFePO_4$) particles (pyrolysis temperature in air: 400° C. or more) as a lithium-containing metal oxide, i.e., a positive electrode active material, polyvinylidene fluoride (PVDF) as a binder, and acetylene black particles were mixed at a mass ratio of 86:7:7. N-methyl-2-pyrrolidone (NMP) as a solvent was suitably added thereto to prepare a slurry.

The slurry was applied to the surface of aluminum foil having the same composition as that used in Example 1 by a doctor blade method with a coating amount (on a dry mass basis) of 6.2 mg/cm², and dried in a drying oven at a temperature of 120° C. for 3 minutes, thereby forming a positive electrode active material layer on one surface of the aluminum foil.

The aluminum foil with the positive electrode active material layer formed on its surface was further heated and dried to completely evaporate the solvent.

Thereafter, the aluminum foil with the positive electrode active material layer formed on its surface was punched into a disc having a diameter of 15.5 mm, and pressed so that the density of the positive electrode active material layer (calculated from the coating amount and thickness) was 1.7 g/cm³.

Thus, the secondary battery positive electrode of Comparative Example 1 in which the positive electrode active material was bound to the surface of the aluminum foil using PVDF as a binder was produced.

The thickness of the positive electrode active material layer in the secondary battery positive electrode of Comparative Example 1 was 40 μm, which was determined in the same manner as in Example 1.

Production of Secondary Battery

Secondary batteries were produced using the secondary battery positive electrodes of Example 1 and Comparative Example 1 in the following manner.

Lithium foil (produced by Honjo Metal Co., Ltd.) was used as a negative electrode; a non-aqueous electrolyte (produced by Kishida Chemical Co., Ltd.) obtained by dissolving lithium hexafluorophosphate at a ratio of 1 mol/l in a solvent prepared by mixing ethylene carbonate (EC) and dimethyl carbonate (DMC) at a volume ratio of 1:1 was used as an electrolyte; and TF4050 (made of paper; produced by Nippon Kodoshi Corporation) was used as a separator. These were accommodated in HS flat cells (produced by KeihinRika Industry Co., Ltd.), together with the secondary battery positive electrodes, to form the secondary batteries of Example 1 and Comparative Example 1.

Evaluation of Secondary Battery

Charge/Discharge Test

Figure 2:
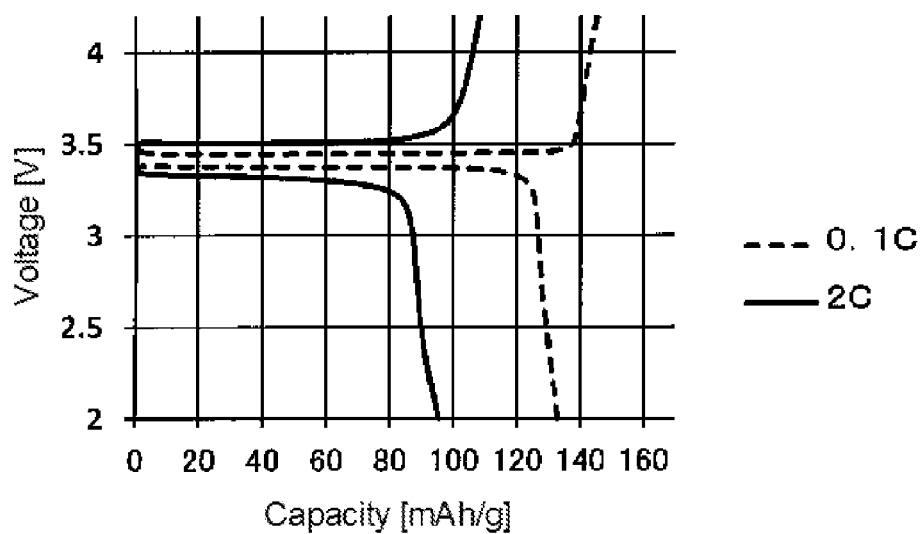
FIG. 2 shows the charge and discharge characteristics of a secondary battery comprising the secondary battery positive electrode produced in Example 1 of the present invention.
Figure 3:
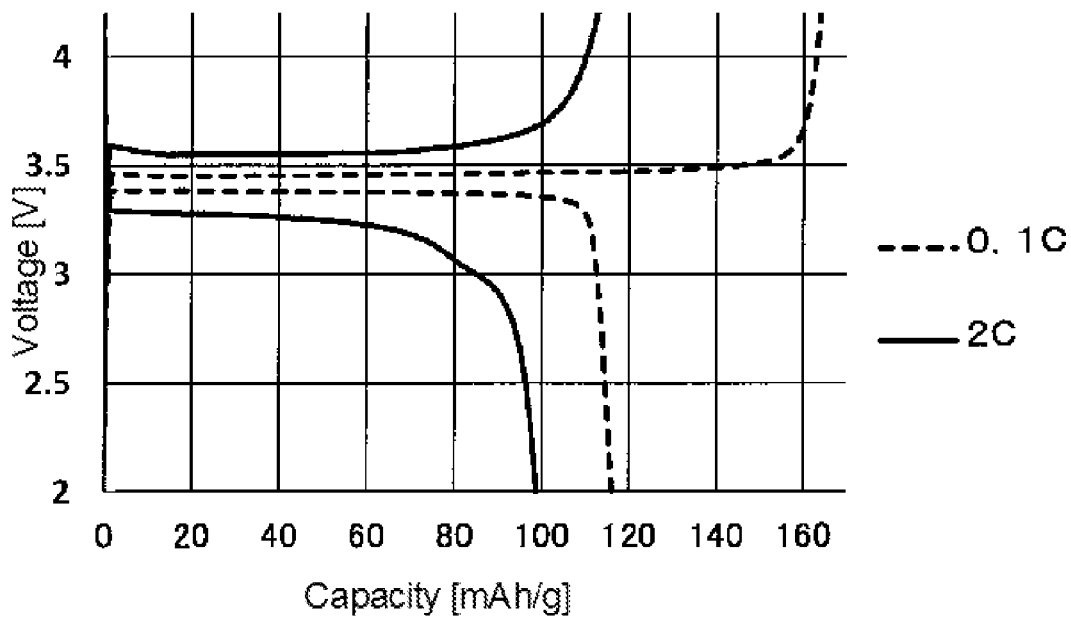
FIG. 3 shows the charge and discharge characteristics of a secondary battery comprising the secondary battery positive electrode produced in Comparative Example 1 of the present invention.

A charge/discharge test was performed using each of the secondary batteries of Example 1 and Comparative Example 1 at 0.1 C (slow: low rate) and 2 C (rapid: high rate). The upper limit voltage during charging and discharging was 4.2 V, and the lower limit voltage was 2.0 V. FIG. 2 shows the results of the charge and discharge characteristics of the secondary battery obtained in the Example, and FIG. 3 shows the results of the charge and discharge characteristics of the secondary battery obtained in Comparative Example 1.

Table 1 below shows voltages (rate conditions) in the flat portions of the discharge curves of FIGS. 2 and 3 at 0.1 C and 2 C, in which the voltages are flat.

TABLE 1

| | Flat portion voltage [V] | |
|---|---|---|
| | Ex. 1 | Comp. Ex. 1 |
| 0.1 C | 3.37 | 3.36 |
| 2 C | 3.31 | 3.25 |

Moreover, since the theoretical voltage value in the flat portions of the discharge curves of the secondary batteries of Example 1 and Comparative Example 1 was 3.43 V, the values of polarization A [V](=(theoretical voltage value in flat portion (3.43 V))−(voltage value in flat portion (Table 1))) were calculated for 0.1 C and 2 C, and are shown in Table 2 below. Further, the difference in polarization A at 0.1 C and 2 C (=(polarization A value at 0.1 C)−(polarization A value at 2 C)) was calculated, and are shown in Table 2.

TABLE 2

| | Polarization A [V] | |
|---|---|---|
| | Ex. 1 | Comp. Ex. 1 |
| 0.1 C | 0.06 | 0.07 |
| 2 C | 0.12 | 0.18 |
| Difference | −0.06 | −0.11 |

When the polarization A values at a rate of 2 C are compared between Example 1 and Comparative Example 1, the polarization A value of Example 1 is lower than that of Comparative Example 1, as shown in Table 2. It is thus found that the secondary battery of Example 1 has less resistance than the secondary battery of Comparative Example 1.

These results also demonstrate that the secondary battery of Example 1 using a positive electrode not containing acetylene black particles as carbon-containing particles has electrical characteristics superior to those of the secondary battery of Comparative Example 1 using a positive electrode containing acetylene black particles as carbon-containing particles. This is presumably because the binder carbonized in the heating step uniformly covered the surface of the positive electrode active material particles.

Moreover, when the differences in polarization A between the secondary battery at a rate of 0.1 C and the secondary battery using a secondary battery positive electrode at a rate of 2 C are compared between Example 1 and Comparative Example 1, the difference in polarization A is lower in Example 1 than in Comparative Example 1, as shown in Table 2. This is presumably because the resistance of Example 1 is less than that of Comparative Example 1. Further, due to the resistance of Example 1 that is less than that of Comparative Example 1, it is presumed that when the secondary battery of Example 1 is produced, and rapid charge and discharge is repeated, the heat generation caused by rapid charge and discharge (heat generated by electrical resistance) is suppressed, and the deterioration of the secondary battery by heat can therefore be suppressed.

Heat Resistance Test A

The secondary battery positive electrodes (before heating) produced in Example 1 and Comparative Example 1 were each maintained at a temperature of 200° C. for 12 hours to thereby produce secondary battery positive electrodes (after heating). Using the obtained secondary battery positive electrodes (after heating) of Example 1 and Comparative Example 1, secondary batteries were produced in the same manner as above. A charge/discharge test was performed using each of the secondary batteries of Example 1 and Comparative Example 1 at a rate of 2 C (rapid: high rate).

Figure 4:
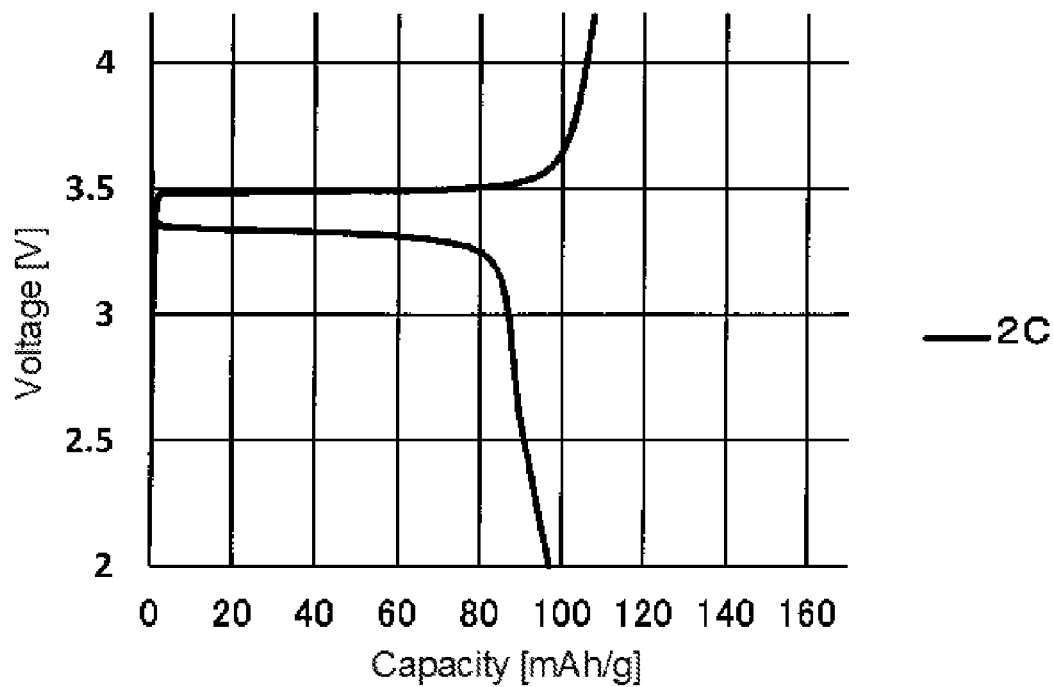
FIG. 4 shows the rapid (2 C) charge and discharge characteristics of a secondary battery comprising the heated secondary battery positive electrode produced in Example 1 of the present invention.
Figure 5:
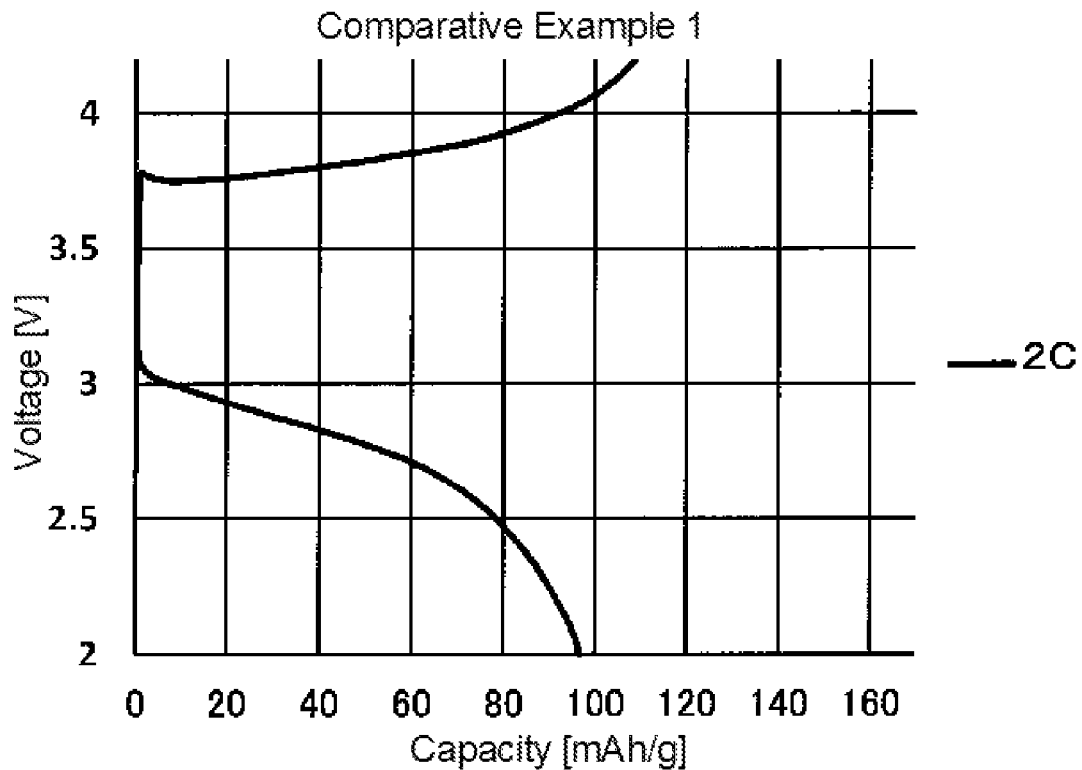
FIG. 5 shows the rapid (2 C) charge and discharge characteristics of a secondary battery comprising the heated secondary battery positive electrode produced in Comparative Example 1 of the present invention.

FIG. 4 shows the results of the rapid (2 C) charge and discharge characteristics of the secondary battery of Example 1 produced using the secondary battery positive electrode (after heating), and FIG. 5 shows the results of the rapid (2 C) charge and discharge characteristics of the secondary battery obtained in Comparative Example 1.

Table 3 below shows voltages (after heating) in the flat portions of the discharge curves (2 C) of FIGS. 4 and 5, in which the voltages are flat. For comparison, Table 3 also shows the voltages in the flat portions of the discharge curves (2 C) of FIGS. 2 and 3, in which the voltages are flat (the flat portion voltages at 2 C of the secondary batteries of Example 1 and Comparative Example 1 produced using the secondary battery positive electrodes (before heating) shown in Table 1).

TABLE 3

| | 2 C flat portion voltage [V] | |
|---|---|---|
| | Ex. 1 | Comp. Ex. 1 |
| Before heating | 3.31 | 3.25 |
| After heating | 3.32 | 2.77 |

Moreover, since the theoretical voltage value of the flat portions in the discharge curves of the secondary batteries of Example 1 and Comparative Example 1 was 3.43 V, the values of polarization A [V](=(theoretical voltage value in flat portion (3.43 V))–(voltage value in flat portion (Table 3))) were calculated, and shown in Table 4 below. Further, the differences in polarization A in the secondary battery using the secondary battery positive electrode before heating and the secondary battery using the secondary battery positive electrode after heating (=(polarization A value before heating)–(polarization A value after heating)) were calculated, and shown in Table 4.

TABLE 4

| | 2 C polarization A [V] | |
|---|---|---|
| | Ex. 1 | Comp. Ex. 1 |
| Before heating | 0.12 | 0.18 |
| After heating | 0.11 | 0.66 |
| Difference | 0.01 | −0.48 |

When Example 1 and Comparative Example 1 are compared regarding the difference in polarization A between the secondary battery using the secondary battery positive electrode before heating and the secondary battery using the secondary battery positive electrode after heating, Table 4 shows that the difference in polarization A is lower in Example 1 than in Comparative Example 1, which thus indicates that the secondary battery of Example 1 has heat resistance superior to that of the secondary battery of Comparative Example 1.

The reason for this is considered to be as follows. The characteristics of the secondary battery of Comparative Example 1 were reduced, presumably because heating of the positive electrode caused the degradation or decomposition PVDF as a binder. On the other hand, the secondary battery of Example 1 showed little difference in the characteristics between before and after heating, presumably because the intervening layer had heat resistance.

Example 2

Step of Forming Positive Electrode Active Material Layer

Lithium iron phosphate (LiFePO$_4$) particles (pyrolysis temperature in air: 400° C. or more) as a lithium-containing metal oxide, i.e., a positive electrode active material, a polyvinyl butyral-based resin as a binder, and aluminum powder were mixed at a mass ratio of 88:5:7. A mixed solvent of toluene, methyl ethyl ketone, methyl isobutyl ketone, and isopropyl alcohol (volume ratio=7:1:1:1) as a solvent was suitably added thereto to prepare a slurry.

The slurry was applied to the surface of aluminum foil having a purity of 99.85% by a doctor blade method with a coating amount (on a dry mass basis) of 10.5 mg/cm², and dried in a drying oven at a temperature of 80° C. for 3 minutes, thereby forming a positive electrode active material layer on one surface of the aluminum foil.

Pressing was performed so that the density of the positive electrode active material layer (calculated from the coating amount and thickness) was 1.94 g/cm³.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 630° C. for 20 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 2 was 54 μm, which was determined in the same manner as in Example 1.

Example 3

Step of Forming Positive Electrode Active Material Layer

Lithium iron phosphate (LiFePO$_4$) particles (pyrolysis temperature in air: 400° C. or more) as a lithium-containing metal oxide, i.e., a positive electrode active material, and a mixed binder of ethyl cellulose-based resin and phenol-based resin (weight ratio=1:2) as a binder were mixed at a mass ratio of 85:15. A mixed solvent of toluene and methyl ethyl ketone (volume ratio=1:1) as a solvent was suitably added thereto to prepare a slurry.

The slurry was applied to the surface of aluminum foil having a purity of 99.85% by a doctor blade method with a coating amount (on a dry mass basis) of 5.4 mg/cm², and dried in a drying oven at a temperature of 70° C. for 5 minutes, thereby forming a positive electrode active material layer on one surface of the aluminum foil. The density of the positive electrode active material layer after coating (calculated from the coating amount and thickness) was 1.54 mg/cm³.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 615° C. for 12 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 3 was 35 µm, which was determined in the same manner as in Example 1.

Example 4

Step of Forming Positive Electrode Active Material Layer

Lithium iron phosphate ($LiFePO_4$) particles (pyrolysis temperature in air: 400° C. or more) as a lithium-containing metal oxide, i.e., a positive electrode active material, and a polyvinyl alcohol-based resin as a binder were mixed at a mass ratio of 80:20. A mixed solvent of water and isopropyl alcohol (volume ratio=1:1) as a solvent was suitably added thereto to prepare a slurry.

The slurry was applied to the surface of aluminum foil having a purity of 99.85% by a doctor blade method with a coating amount (on a dry mass basis) of 5.1 mg/cm$^2$, and dried in a drying oven at a temperature of 120° C. for 5 minutes, thereby forming a positive electrode active material layer on one surface of the aluminum foil.

Pressing was performed so that the density of the positive electrode active material layer (calculated from the coating amount and thickness) was 1.83 g/cm$^3$.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 630° C. for 20 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 4 was 28 µm, which was determined in the same manner as in Example 1.

Example 5

Step of Forming Positive Electrode Active Material Layer

Lithium iron phosphate ($LiFePO_4$) particles (pyrolysis temperature in air: 400° C. or more) as a lithium-containing metal oxide, i.e., a positive electrode active material, a polyvinyl butyral-based resin as a binder, and aluminum powder were mixed at a mass ratio of 88:5:7. A mixed solvent of toluene, methyl ethyl ketone, methyl isobutyl ketone, and isopropyl alcohol (volume ratio=7:1:1:1) as a solvent was suitably added thereto to prepare a slurry.

The slurry was applied to the surface of aluminum foil having a purity of 99.85% by a doctor blade method with a coating amount (on a dry mass basis) of 14.0 mg/cm$^2$, and dried in a drying oven at a temperature of 80° C. for 3 minutes, thereby forming a positive electrode active material layer on one surface of the aluminum foil.

Pressing was performed so that the density of the positive electrode active material layer (calculated from the coating amount and thickness) was 2.03 g/cm$^3$.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 630° C. for 20 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 5 was 69 µm, which was determined in the same manner as in Example 1.

Example 6

Step of Forming Positive Electrode Active Material Layer

Spinel-type lithium manganate ($LiMn_2O_4$) particles (pyrolysis temperature in air: 350° C. or more) as a lithium-containing metal oxide, i.e., a positive electrode active material, and a polyvinyl butyral-based resin as a binder were mixed at a mass ratio of 80:20. A mixed solvent of toluene, methyl ethyl ketone, methyl isobutyl ketone, and isopropyl alcohol (volume ratio=7:1:1:1) as a solvent was suitably added thereto to prepare a slurry.

The slurry was applied to the surface of aluminum foil having a purity of 99.85% by a doctor blade method with a coating amount (on a dry mass basis) of 7.0 mg/cm$^2$, and dried in a drying oven at a temperature of 80° C. for 3 minutes, thereby forming a positive electrode active material layer on one surface of the aluminum foil.

Pressing was performed so that the density of the positive electrode active material layer (calculated from the coating amount and thickness) was 2.12 g/cm$^3$.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 615° C. for 15 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 6 was 33 μm, which was determined in the same manner as in Example 1.

Example 7

Step of Forming Positive Electrode Active Material Layer

Lithium nickel manganese cobalt oxide ($LiNi_{1/3}Mn_{1/3}Co_{1/3}O_2$) particles (pyrolysis temperature in air: 300° C. or more) as a lithium-containing metal oxide, i.e., a positive electrode active material, and a polyvinyl butyral-based resin as a binder were mixed at a mass ratio of 80:20. A mixed solvent of toluene, methyl ethyl ketone, methyl isobutyl ketone, and isopropyl alcohol (volume ratio=7:1:1:1) as a solvent was suitably added thereto to prepare a slurry.

The slurry was applied to the surface of aluminum foil having a purity of 99.85% by a doctor blade method with a coating amount (on a dry mass basis) of 6.8 mg/cm$^2$, and dried in a drying oven at a temperature of 50° C. for 3 minutes, thereby forming a positive electrode active material layer on one surface of the aluminum foil.

Pressing was performed so that the density of the positive electrode active material layer (calculated from the coating amount and thickness) was 2.20 g/cm$^3$.

Further, the aluminum foil with the positive electrode active material layer formed on its surface was heated and dried in an air atmosphere. The drying promotes the degradation of a fixed amount of binder, which can thereby adjust the binder content of the positive electrode active material layer. As a result, a gap is formed between the aluminum foil and the positive electrode active material layer in a subsequent heating step, facilitating the infiltration of methane gas, and the formation of an intervening layer. Consequently, the adhesion between the aluminum foil and the positive electrode active material layer is improved after the heating step.

Heating Step

The aluminum foil with the positive electrode active material layer formed on its surface was maintained in a methane gas atmosphere at a temperature of 615° C. for 15 hours, thereby forming an intervening layer between the aluminum foil and the positive electrode active material layer. Thereafter, the aluminum foil with the positive electrode active material layer formed on its surface was punched into a disc having a diameter of 15.5 mm.

Thus, the secondary battery positive electrode of the present invention was produced.

The thickness of the positive electrode active material layer in the secondary battery positive electrode of the present invention obtained in Example 7 was 31 μm, which was determined in the same manner as in Example 1.

Comparative Examples 2 to 5

Lithium iron phosphate ($LiFePO_4$) particles (pyrolysis temperature in air: 400° C. or more) as a lithium-containing metal oxide, i.e., a positive electrode active material, polyvinylidene fluoride (PVDF) as a binder, and acetylene black (AB) particles were mixed. N-methyl-2-pyrrolidone (NMP) as a solvent was suitably added thereto to prepare slurries. The proportions of iron phosphate lithium ($LiFePO_4$) particles, polyvinylidene fluoride (PVDF), and acetylene black (AB) particles are shown in Table 5 below as slurry proportions.

TABLE 5

| | Slurry proportion | Coating amount (mg/cm$^2$) | Density (g/cm$^3$) | Thickness (μm) |
|---|---|---|---|---|
| Comp. Ex. 2 | LiFePO$_4$:PVDF:AB = 90:5:5 | 6.84 | 2.07 | 33 |
| Comp. Ex. 3 | LiFePO$_4$:PVDF:AB = | 5.48 | 1.77 | 31 |
| Comp. Ex. 4 | 86:7:7 | 4.45 | 1.78 | 25 |
| Comp. Ex. 5 | LiFePO$_4$:PVDF:AB = 90:5:5 | 11.2 | 2.07 | 54 |

The slurries were each applied to the surface of aluminum foil having the same composition as that used in Example 1 by a doctor blade method with the coating amount (on a dry mass basis) shown in Table 5, and dried in a drying oven at a temperature of 120° C. for 10 minutes, thereby forming a positive electrode active material layer on one surface of the aluminum foil.

Thereafter, pressing was performed so that the density of each positive electrode active material layer (calculated from the coating amount and thickness) was in the range of 1.77 g/cm$^3$ to 2.07 g/cm$^3$, and the aluminum foil with the positive electrode active material layer formed on its surface was punched into a disc having a diameter of 15.5 mm. Table 5 shows the specific density of each positive electrode active material.

Thus, the secondary battery positive electrodes of Comparative Examples 2 to 5 in which the positive electrode active material was bound to the surface of the aluminum foil using PVDF as a binder were produced.

The thickness of the positive electrode active material layers in the secondary battery positive electrodes of Comparative Examples 2 to 5 was in the range of 25 μm to 54 μm, which was determined in the same manner as in Example 1.

Comparative Example 6

Spinel-type lithium manganate ($LiMn_2O_4$) particles (pyrolysis temperature in air: 350° C. or more) as a lithium-containing metal oxide, i.e., a positive electrode active material, polyvinylidene fluoride (PVDF) as a binder, and acetylene black particles were mixed at a mass ratio of 90:5:5. N-methyl-2-pyrrolidone (NMP) as a solvent was suitably added thereto to prepare a slurry.

The slurry was applied to the surface of aluminum foil having the same composition as that used in Example 1 by a doctor blade method with a coating amount (on a dry mass basis) of 6.2 mg/cm$^2$, and dried in a drying oven at a temperature of 80° C. for 20 minutes, thereby forming a positive electrode active material layer on one surface of the aluminum foil.

Thereafter, pressing was performed so that the density of the positive electrode active material layer (calculated from the coating amount and thickness) was 2.14 g/cm$^3$, and the aluminum foil with the positive electrode active material layer formed on its surface was punched into a disc having a diameter of 15.5 mm.

Thus, the secondary battery positive electrode of Comparative Example 6 in which the positive electrode active material was bound to the surface of the aluminum foil using PVDF as a binder was produced.

The thickness of the positive electrode active material layer in the secondary battery positive electrode of Comparative Example 6 was 29 Jim, which was determined in the same manner as in Example 1.

Comparative Example 7

Lithium nickel manganese cobalt oxide (LiNi$_{1/3}$Mn$_{1/3}$Co$_{1/3}$O$_2$) particles (pyrolysis temperature in air: 300° C. or more) as a lithium-containing metal oxide, i.e., a positive electrode active material, polyvinylidene fluoride (PVDF) as a binder, and acetylene black particles were mixed at a mass ratio of 90:5:5. N-methyl-2-pyrrolidone (NMP) as a solvent was suitably added thereto to prepare a slurry.

The slurry was applied to the surface of aluminum foil having the same composition as that used in Example 1 by a doctor blade method with a coating amount (on a dry mass basis) of 5.5 mg/cm$^2$, and dried in a drying oven at a temperature of 80° C. for 20 minutes, thereby forming a positive electrode active material layer on one surface of the aluminum foil.

Thereafter, pressing was performed so that the density of the positive electrode active material layer (calculated from the coating amount and thickness) was 2.20 g/cm$^3$, and the aluminum foil with the positive electrode active material layer formed on its surface was punched into a disc having a diameter of 15.5 mm.

Thus, the secondary battery positive electrode of the Comparative Example in which the positive electrode active material was bound to the surface of the aluminum foil using PVDF as a binder was produced.

The thickness of the positive electrode active material layer in the secondary battery positive electrode of the Comparative Example was 25 µm, which was determined in the same manner as in Example 1.

Production of Secondary Battery

Secondary batteries were produced using the secondary battery positive electrodes of Examples 2 to 5 and Comparative Example 2 to 5 in the following manner.

The obtained positive electrode materials were heated and dried in a vacuum-drying furnace to completely evaporate the moisture.

Lithium foil (produced by Honjo Metal Co., Ltd.) was used as a negative electrode; a non-aqueous electrolyte (produced by Kishida Chemical Co., Ltd.) obtained by dissolving lithium hexafluorophosphate at a ratio of 1 mol/l in a solvent prepared by mixing ethylene carbonate (EC) and dimethyl carbonate (DMC) at a volume ratio of 1:1 was used as an electrolyte; and a GA-100 glass filter (produced by Toyo Roshi Kaisha, Ltd.) was used as a separator. These were accommodated in HS flat cells (produced by Keihin-Rika Industry Co., Ltd.), together with the secondary battery positive electrodes, to form the secondary batteries of Examples 2 to 5 and Comparative Examples 2 to 5.

Evaluation of Secondary Battery
Charge/Discharge Test

Using the secondary batteries of Example 2 and Comparative Example 2, the secondary batteries of Example 3 and Comparative Example 3, and the secondary batteries of Example 4 and Comparative Example 4, charge/discharge tests were performed under conditions from a slow rate (low rate) to a rapid rate (high rate). Specific discharge rate conditions were as follows: from 0.5 C to 20 C in Example 2 and Comparative Example 2; from 0.5 C to 2 C in Example 3 and Comparative Example 3; and from 0.5 C to 5 C in Example 4 and Comparative Example 4. The upper limit voltage during charging and discharging was 4.2 V, and the lower limit voltage was 2.0 V.

Figure 6:
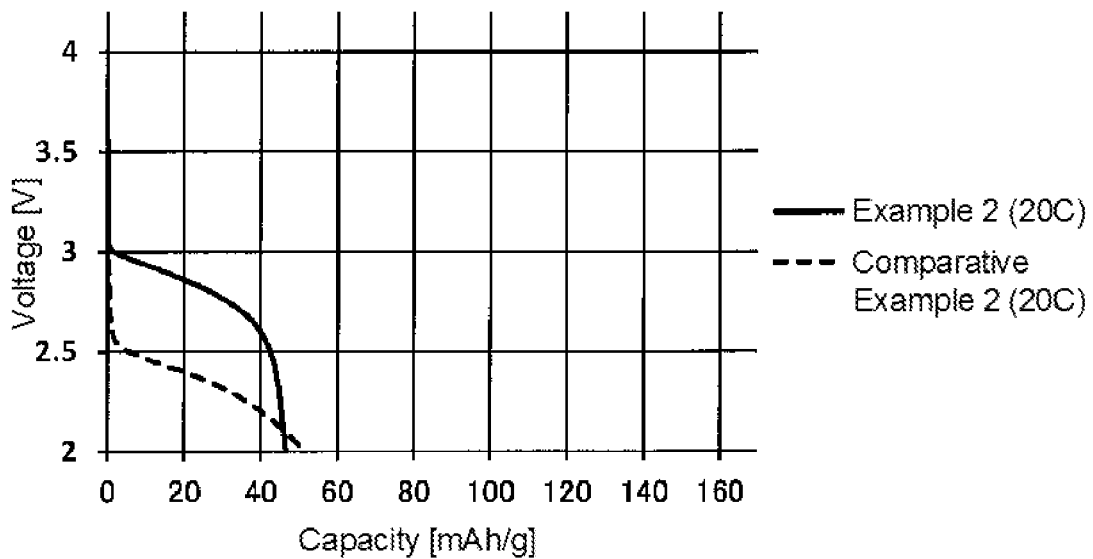
FIG. 6 shows the charge and discharge characteristics of secondary batteries respectively comprising the secondary battery positive electrodes produced in Example 2 and Comparative Example 2 of the present invention.
Figure 7:
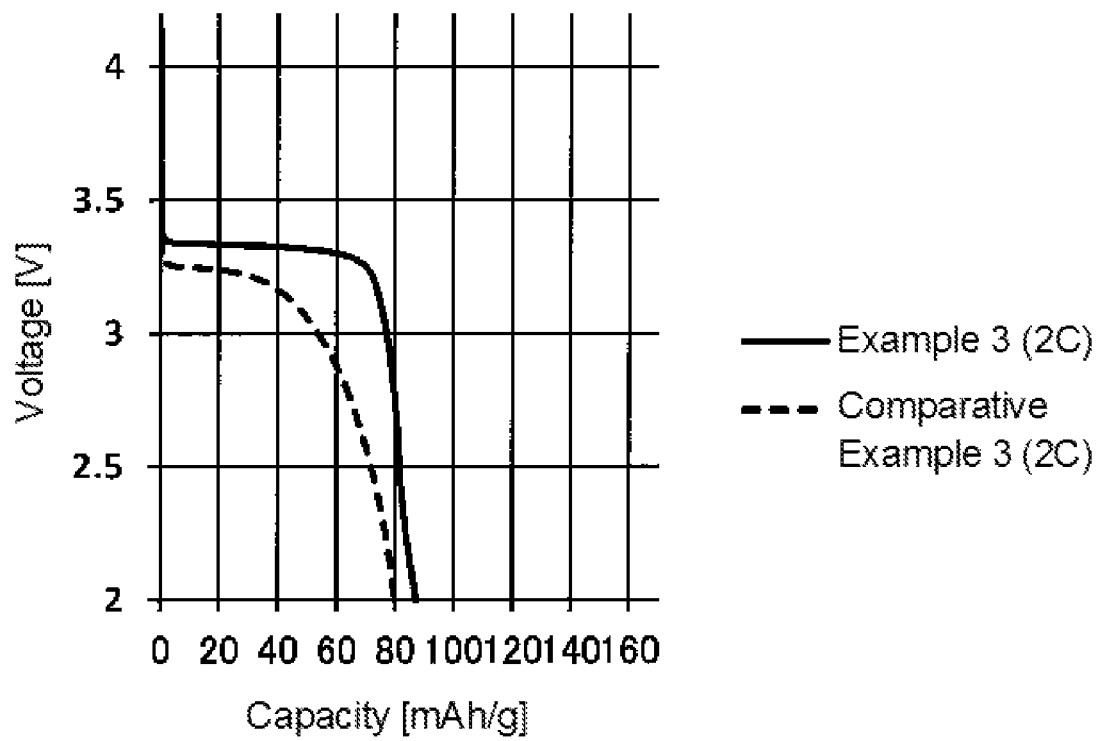
FIG. 7 shows the charge and discharge characteristics of secondary batteries respectively comprising the secondary battery positive electrodes produced in Example 3 and Comparative Example 3 of the present invention.

FIG. 6 shows the discharge curves at 20 C obtained in Example 2 and Comparative Example 2, and FIG. 7 shows the discharge curves at 2 C obtained in Example 3 and Comparative Example 3.

Figure 8:
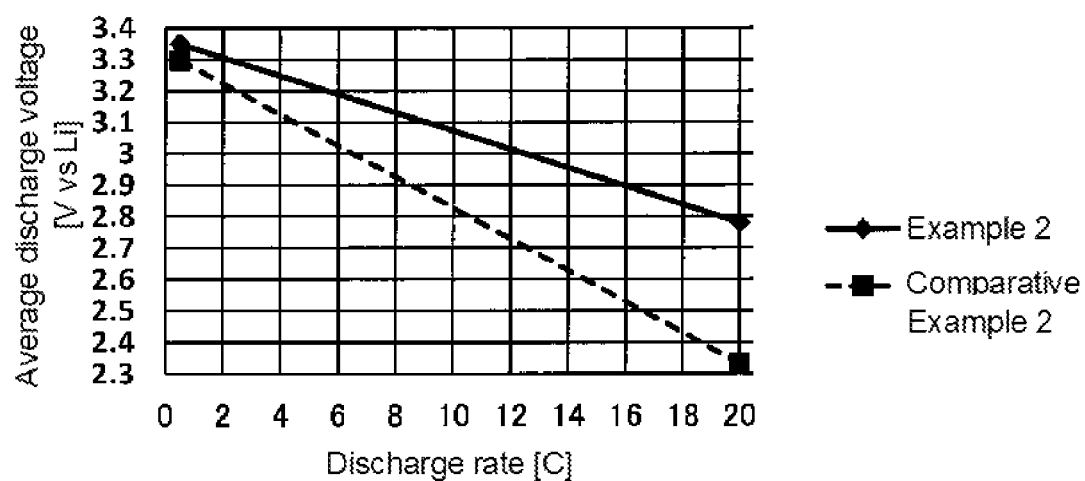
FIG. 8 shows the relationship between the discharge rate and average discharge voltage of secondary batteries respectively comprising the secondary battery positive electrodes produced in Example 2 and Comparative Example 2 of the present invention.
Figure 9:
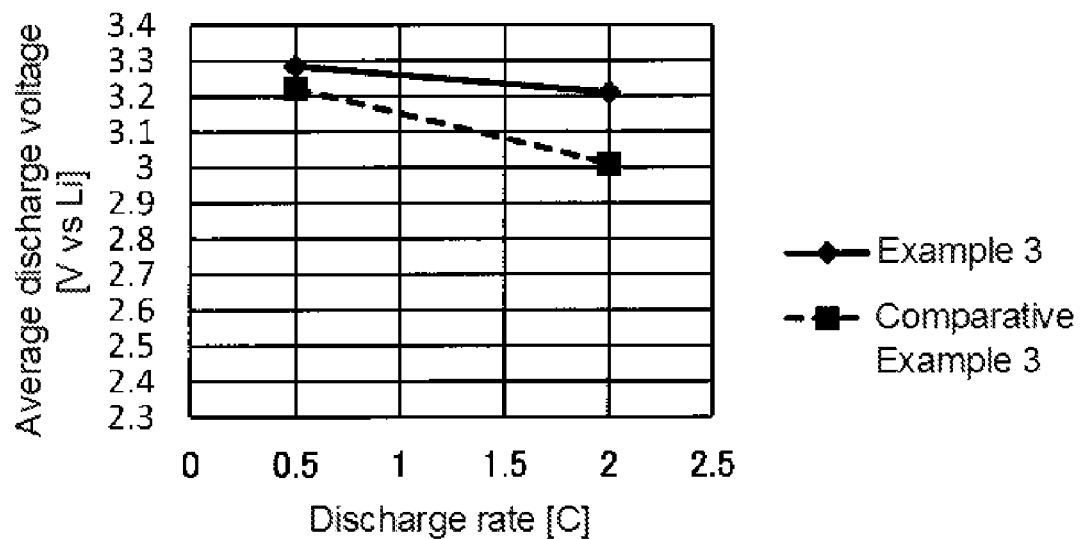
FIG. 9 shows the relationship between the discharge rate and average discharge voltage of secondary batteries respectively comprising the secondary battery positive electrodes produced in Example 3 and Comparative Example 3 of the present invention.
Figure 10:
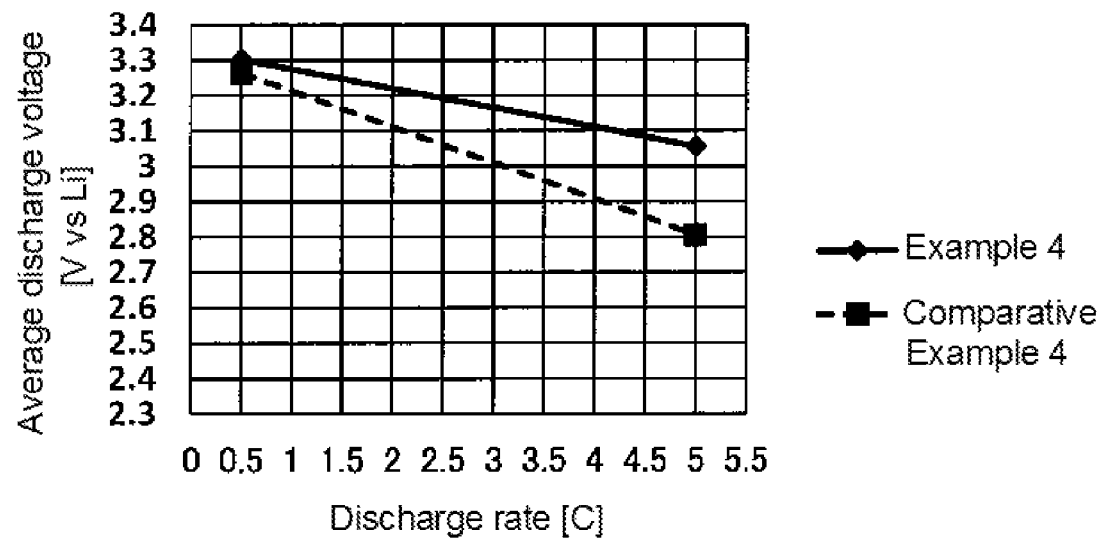
FIG. 10 shows the relationship between the discharge rate and average discharge voltage of secondary batteries respectively comprising the secondary battery positive electrodes produced in Example 4 and Comparative Example 4 of the present invention.

Moreover, among the obtained charge/discharge test results, the average discharge voltage was plotted against each discharge rate. FIG. 8 shows the results of the relationship between the discharge rate and average discharge voltage of the secondary batteries obtained in Example 2 and Comparative Example 2. FIG. 9 shows the results of the relationship between the discharge rate and average discharge voltage of the secondary batteries obtained in Example 3 and Comparative Example 3. FIG. 10 shows the results of the relationship between the discharge rate and average discharge voltage of the secondary batteries obtained in Example 4 and Comparative Example 4.

The average discharge voltage is calculated by the following formula:

Assuming that the elapsed time from the start of discharge in each measurement data 1, 2, . . . n at discharge mode is T (1, 2 . . . n), and that the discharge voltage relative to each elapsed time T is V (1, 2, . . . n), when the middle point of voltage change width is expressed by v(n)={V(n−1)+V(n)}/2, and the time change width is expressed by t(n)=T(n)−T(n−1), the average discharge voltage is represented by the following formula:

$$\text{Average discharge voltage} = [\Sigma_{n-1}^{n}\{v(k) \times t(k)\}]/T(n)$$

Tables 6, 8, and 10 below show the average discharge voltage [V] calculated for each of the second batteries of Examples 2 to 4 and Comparative Examples 2 to 4.

Moreover, since the theoretical average discharge voltage value in the discharge curves of the secondary batteries was 3.43 V, the value of Polarization B [V](=(theoretical average discharge voltage value (3.43 V))−(average discharge voltage value)) was calculated for each of the secondary batteries of Examples 2 to 4 and Comparative Examples 2 to 4.

Tables 7, 9, and 11 below show the polarization B [V]calculated for each of the second batteries of Examples 2 to 4 and Comparative Example 2 to 4.

TABLE 6

| | Average discharge voltage [V] | |
|---|---|---|
| Rate [C] | Ex. 2 | Comp. Ex. 2 |
| 0.5 | 3.35 | 3.30 |
| 20 | 2.78 | 2.33 |

TABLE 7

| Polarization B [V] | | |
|---|---|---|
| | Ex. 2 | Comp. Ex. 2 |
| 0.5 C | 0.08 | 0.13 |
| 20 C | 0.65 | 1.10 |
| Difference | −0.57 | −0.97 |

TABLE 8

| Average discharge voltage [V] | | |
|---|---|---|
| Rate [C] | Ex. 3 | Comp. Ex. 3 |
| 0.5 | 3.28 | 3.22 |
| 2 | 3.21 | 3.01 |

TABLE 9

| Polarization B [V] | | |
|---|---|---|
| | Ex. 3 | Comp. Ex. 3 |
| 0.5 C | 0.15 | 0.21 |
| 2 C | 0.22 | 0.42 |
| Difference | −0.07 | −0.21 |

TABLE 10

| Average discharge voltage [V] | | |
|---|---|---|
| Rate [C] | Ex. 4 | Comp. Ex. 4 |
| 0.5 | 3.30 | 3.26 |
| 5 | 3.06 | 2.81 |

TABLE 11

| Polarization B [V] | | |
|---|---|---|
| | Ex. 4 | Comp. Ex. 4 |
| 0.5 C | 0.13 | 0.17 |
| 5 C | 0.37 | 0.62 |
| Difference | −0.24 | −0.45 |

The results of FIGS. 6 and 7 demonstrate that the secondary batteries of Examples 2 and 3 using positive electrodes not containing acetylene black particles as carbon-containing particles have electrical characteristics superior to those of the secondary batteries of Comparative Examples 2 and 3 using positive electrodes containing acetylene black particles as carbon-containing particles. This is presumably because the binder carbonized in the heating step uniformly covered the surface of the positive electrode active material particles.

A comparison of Example 2 and Comparative Example 2 regarding the average discharge voltage values at a rate of 20 C revealed that the average discharge voltage value of Example 2 is higher than that of Comparative Example 2, as shown in FIG. 8 and Table 6, and the polarization of Example 2 is lower than that of Comparative Example 2, as shown in Table 7. This demonstrates that the secondary battery of Example 2 has less resistance than the secondary battery of Comparative Example 2.

A comparison of Example 3 and Comparative Example 3 regarding the average discharge voltage values at a rate of 2 C revealed that the average discharge voltage value of Example 3 is higher than that of Comparative Example 3, as shown in FIG. 9 and Table 8, and the polarization of Example 3 is lower than that of Comparative Example 3, as shown in Table 9. This demonstrates that the secondary battery of Example 3 has less resistance than the secondary battery of Comparative Example 3.

A comparison of Example 4 and Comparative Example 4 regarding the average discharge voltage values at a rate of 5 C revealed that the average discharge voltage value of Example 4 is higher than that of Comparative Example 4, as shown in FIG. 10 and Table 10, and the polarization of Example 4 is lower than that of Comparative Example 4, as shown in Table 11. This demonstrates that the secondary battery of Example 4 has less resistance than the secondary battery of Comparative Example 4.

Similarly in Example 6 and Comparative Example 6, and in Example 7 and Comparative Example 7, secondary batteries were produced, and the charge and discharge characteristics were observed. As a result, it was confirmed that the secondary batteries of the Examples had less resistance in both cases.

Further, due to the resistance of Examples 2 to 4, 6, and 7 that is less than that of Comparative Examples 2 to 4, 6, and 7, it is presumed that when the secondary batteries of Examples 2 to 4, 6, and 7 are produced, and rapid charge and discharge is repeated, the heat generation caused by rapid charge and discharge (heat generated by electrical resistance) is suppressed, and the deterioration of the secondary batteries by heat can therefore be suppressed.

Heat Resistance Test B

Figure 11:
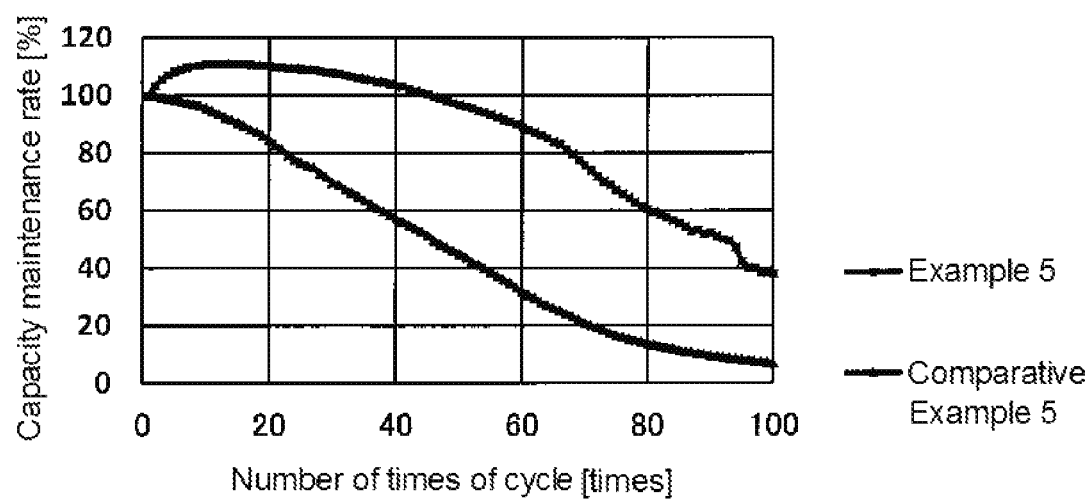
FIG. 11 shows the changes in discharge capacity relative to the number of times of charge and discharge cycle (capacity maintenance rate) in a heat resistance test of secondary batteries respectively comprising the secondary battery positive electrodes produced in Example 5 and Comparative Example 5 of the present invention.

The secondary batteries of Example 5 and Comparative Example 5 were each placed in a thermostat at 60° C., and a charge/discharge test was performed at a rate of 3 C. FIG. 11 shows changes in discharge capacity relative to the number of times of cycle (capacity maintenance rate) in Example 5 and Comparative Example 5 when the initial discharge capacity was set to 100%

When Example 5 and Comparative Example 5 are compared regarding the changes in discharge capacity relative to the number of times of cycle, the reduction in discharge capacity is less in Example 5 than in Comparative Example 5, as shown in FIG. 11. This demonstrates that the secondary battery of Example 5 has heat resistance superior to that of the secondary battery of Comparative Example 5.

The reason for this is considered to be as follows. The characteristics of the secondary battery of Comparative Example 5 were reduced, presumably because heating of the secondary battery caused PVDF as a binder to absorb the electrolyte to be swollen, and the PVDF was deteriorated due to the repeated charge and discharge, leading to the peeling of the positive electrode active material layer. On the other hand, the decrease in the discharge capacity of the secondary battery of Example 5 was suppressed even when the battery was charged and discharged at a high temperature, presumably because a binder with a low heat resistance was not used, and the intervening layer had heat resistance.

Similarly in Example 6 and Comparative Example 6, and Example 7 and Comparative Example 7, secondary batteries were produced, and the heat resistance test B was performed to confirm the heat resistance of the secondary batteries. As a result, it was confirmed that the secondary batteries of Examples 6 and 7 had superior heat resistance in both cases.

It is to be considered that the embodiments and Examples disclosed herein are exemplifications in all respects and are not limitative. The scope of the present invention is shown not by the above embodiments or Examples, but by the claims, and it is intended that all corrections and modifications equivalent to or within the scope of the claims are contained therein.

INDUSTRIAL APPLICABILITY

When the secondary battery positive electrode of the present invention is used to constitute a secondary battery, particularly a lithium ion battery, lithium ion polymer battery, etc., the rapid charge and discharge characteristics of the secondary battery can be improved, and the heat resistance of the secondary battery can be increased.

The invention claimed is:

1. A secondary battery positive electrode comprising:
   an aluminum material;
   a positive active material layer comprising a lithium-containing metal oxide as a positive active material, and formed on the surface of the aluminum material; and
   an intervening layer comprising aluminum and carbon, and formed between the aluminum material and the positive active material layer;
   the intervening layer being formed in a partial region of the surface of the aluminum material,
   the intervening laying being in contact with the positive active material layer, and
   the positive electrode active material layer being free from polyvinylidene fluoride.

2. The secondary battery positive electrode according to claim 1, wherein the lithium-containing metal oxide is $LiFePO_4$.

3. The secondary battery positive electrode according to claim 1, wherein the intervening layer includes a surface portion formed at least in a partial region of the surface of the aluminum material and comprising aluminum carbide.

4. A secondary battery comprising the secondary battery positive electrode according to claim 1.

5. The secondary battery according to claim 4, wherein the secondary battery is a lithium ion battery or a lithium ion polymer battery.

6. A method for producing a secondary battery positive electrode, comprising the steps of:
   forming a positive active material layer comprising a lithium-containing metal oxide as a positive active material directly on the surface of an aluminum material; and
   heating the aluminum material with the positive active material layer formed thereon in a space containing a hydrocarbon-containing substance;
   wherein the positive electrode active material layer is free from polyvinylidene fluoride.

7. The method for producing a secondary battery positive electrode according to claim 6, wherein the heating step is performed at a temperature of 450° C. or more and less than 660° C.

* * * * *